No. 666,964. Patented Jan. 29, 1901.
F. P. LAWS.
CAR FENDER.
(Application filed Oct. 15, 1900.)
(No Model.)
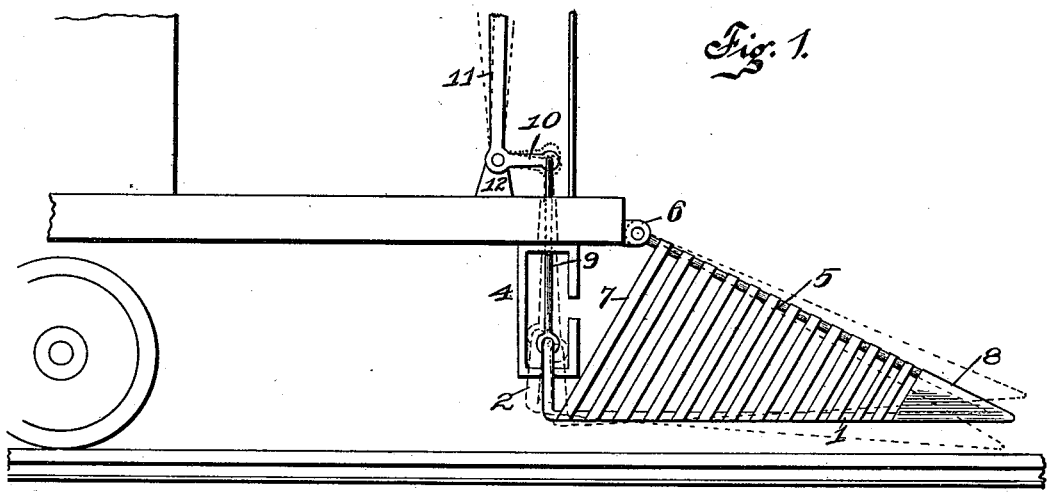
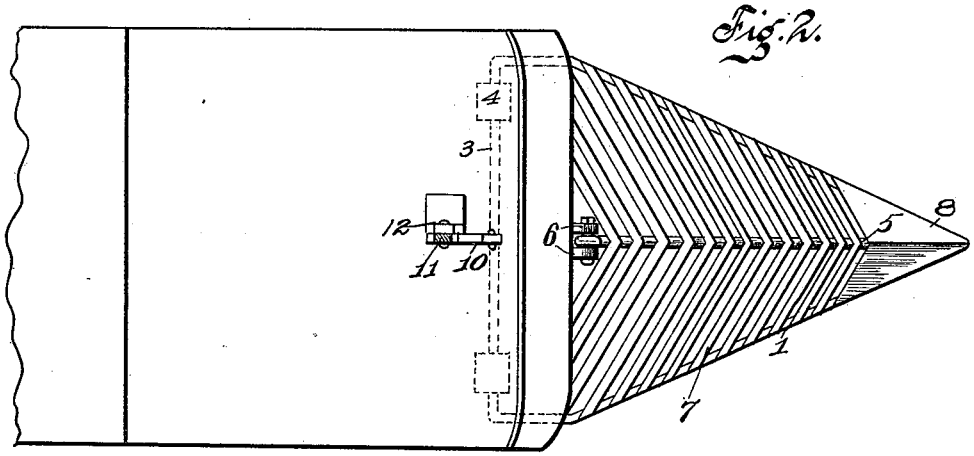
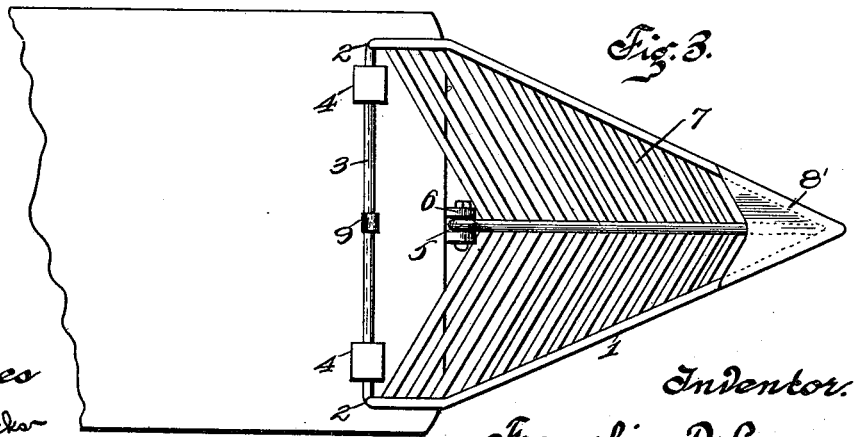
Witnesses
Alfred O. Eicks
J. D. Rippey
Inventor.
Franklin P. Laws.
By Higdon & Longan, Attys.

UNITED STATES PATENT OFFICE.

FRANKLIN P. LAWS, OF ST. LOUIS, MISSOURI, ASSIGNOR OF ONE-HALF TO FRANK H. HOUGHTON, OF SAME PLACE.

CAR-FENDER.

SPECIFICATION forming part of Letters Patent No. 666,964, dated January 29, 1901.

Application filed October 15, 1900. Serial No. 33,113. (No model.)

*To all whom it may concern:*

Be it known that I, FRANKLIN P. LAWS, of the city of St. Louis, State of Missouri, have invented certain new and useful Improvements in Car-Fenders, of which the following is a full, clear, and exact description, reference being had to the accompanying drawings, forming a part hereof.

This invention relates to car-fenders; and it consists of the novel construction, combination, and arrangement of parts hereinafter shown, described, and claimed.

Figure 1 is a side elevation showing my improved car-fender attached to a car. Fig. 2 is a plan view of the same. Fig. 3 is a view from below.

In the construction of my improved car-fender I provide an outer frame 1, substantially V-shaped and the point of which is at the front. The rear ends of the side members comprising the frame 1 are turned upwardly a suitable distance, as indicated by 2, and are connected by the integral transverse portion 3. The member 3 passes through the frames 4, the purpose of which frames is to assist in retaining the car-fender in the desired adjustment. A central rod 5 has its rear end secured to a clip 6, which is secured to the end of the car-body. The strips 7 have their ends secured to the frame 1, and their central portion is held elevated by means of the rod 5, thereby forming a fender, the tendency of which is to throw the object contacting therewith laterally from the track. A plate 8 is preferably secured over the point of the fender instead of the short strips 7 which would be required in that position. A similar plate 8' is secured beneath the point of the fender, by means of which should the fender be lowered it will be enabled to slide over any obstruction with which it may come in contact.

Connected to the middle of the member 3 is a rod 9, operating vertically through an opening in the bottom of the car and connected at its upper end to a horizontal arm 10, rigid with the vertical operating-lever 11, which is pivoted to a suitable support 12, secured to the bottom of the car.

A car-fender constructed as described is adapted to be operated up and down by the motorman or conductor by the manipulation of the lever 11. When any object is seen on the track, the operator engages the lever 11 and draws it rearwardly, which raises the rear ends of the side members 1, causing the forward end of the fender to assume the lowered position shown by dotted lines in Fig. 1. The fender may be raised by operating the lever 11 forwardly, which lowers the rear end of the side members 1 and causes the forward end of the fender to assume the elevated position shown by upper dotted lines in Fig. 1.

Rubber or other soft material may be secured to the end of the car-body to prevent injury to the persons or objects against which the fender contacts.

By this arrangement an improved fender is provided which is under the absolute control of the operator and may be operated by him either up or down without any danger of any of the parts becoming displaced, thereby causing the fender to become inoperative. These features give to the improved fender superior advantages not possessed by those of ordinary construction.

I claim—

A fender consisting of a V-shaped frame, a central rod connected to said frame at its forward end and having its rear end pivoted to the car-body, transverse strips passing over the central rod and having their lower ends connected to the sides of the frame, a plate covering the forward end of the fender, a transverse rod across the rear end of the fender below the car, guide-frames for retaining said rod in position, and a lever above the car-floor having connection leading to the transverse rod for operating the fender, substantially as specified.

In testimony whereof I affix my signature in presence of two witnesses.

FRANKLIN P. LAWS.

Witnesses:
 EDWARD E. LONGAN,
 J. D. RIPPEY.